(12) United States Patent
Otsuya et al.

(10) Patent No.: US 11,178,593 B2
(45) Date of Patent: Nov. 16, 2021

(54) TERMINAL, RELAY APPARATUS SELECTION APPARATUS, COMMUNICATION METHOD, RELAY APPARATUS SELECTION METHOD, AND PROGRAM

(71) Applicant: NTT Communications Corporation, Chiyoda-ku (JP)

(72) Inventors: Ryosuke Otsuya, Miura-gun (JP); Yoshimasa Iwase, Hino (JP)

(73) Assignee: NTT Communications Corporation, Chiyoda-ku (JP)

( * ) Notice: Subject to any disclaimer, the term of this patent is extended or adjusted under 35 U.S.C. 154(b) by 676 days.

(21) Appl. No.: 16/074,400

(22) PCT Filed: Jan. 31, 2017

(86) PCT No.: PCT/JP2017/003431
§ 371 (c)(1),
(2) Date: Jul. 31, 2018

(87) PCT Pub. No.: WO2017/135254
PCT Pub. Date: Aug. 10, 2017

(65) Prior Publication Data
US 2021/0195498 A1    Jun. 24, 2021

(30) Foreign Application Priority Data
Feb. 2, 2016 (JP) .............................. JP2016-018145

(51) Int. Cl.
*H04W 40/28* (2009.01)
*H04L 12/26* (2006.01)
(Continued)

(52) U.S. Cl.
CPC ......... *H04W 40/28* (2013.01); *H04L 43/0864* (2013.01); *H04L 45/121* (2013.01); *H04W 40/12* (2013.01)

(58) Field of Classification Search
CPC .. H04W 40/28; H04W 40/12; H04L 43/0864; H04L 45/121; H04L 65/80
See application file for complete search history.

(56) References Cited

U.S. PATENT DOCUMENTS 6,483,835 B1 * 11/2002 Tanigawa ................ H04L 12/14
                                                        370/395.21
7,225,261 B2 * 5/2007 Nishiguchi ........... H04L 69/329
                                                        709/227
(Continued)

FOREIGN PATENT DOCUMENTS

CN          102664901 A       9/2012
JP          2015-73193 A      4/2015
(Continued)

OTHER PUBLICATIONS

International Search Report dated Apr. 25, 2017 in PCT/JP2017/003431 filed Jan. 31, 2017.
(Continued)

*Primary Examiner* — Chandrahas B Patel
(74) *Attorney, Agent, or Firm* — Oblon, McClelland, Maier & Neustadt, L.L.P.

(57) ABSTRACT

A terminal used as a terminal in a plurality of terminals in a system including the plurality of terminals that communicate with each other and a plurality of relay apparatuses. The terminal is configured to measure a delay time between the terminal and each relay apparatus of the plurality of relay apparatuses; select a relay apparatus from the plurality of relay apparatuses based on the delay time measured by the
(Continued)

measurement means; and perform communication with another terminal via the relay apparatus.

4 Claims, 10 Drawing Sheets

(51) Int. Cl.
*H04L 12/727* (2013.01)
*H04W 40/12* (2009.01)

(56) References Cited

U.S. PATENT DOCUMENTS

| | | | | |
|---|---|---|---|---|
| 7,522,591 | B2* | 4/2009 | Kiyoto | H04L 67/322 370/389 |
| 7,720,000 | B2* | 5/2010 | Yoshida | H04L 45/125 370/252 |
| 8,953,645 | B2* | 2/2015 | Kitayama | H04L 12/42 370/503 |
| 10,333,824 | B1* | 6/2019 | Judge | H04L 43/0852 |
| 2011/0242971 | A1 | 10/2011 | Kokado | |
| 2014/0177460 | A1 | 6/2014 | Keskkula et al. | |
| 2015/0092784 | A1 | 4/2015 | Nakata et al. | |
| 2015/0381566 | A1 | 12/2015 | Lohner et al. | |

FOREIGN PATENT DOCUMENTS

| | | |
|---|---|---|
| JP | 2015-153076 A | 8/2015 |
| WO | WO 2010/073656 A1 | 7/2010 |
| WO | WO 2014/105017 A | 7/2014 |

OTHER PUBLICATIONS

Japanese Office Action of JP Application No. 2016-018145; dated May 9, 2017, 4 pages.
Japanese Office Action of JP Application No. 2018-018145 dated Aug. 1, 2017, 3 pages.
Zhang, X. et al., "Using P2P Network to Transmit Media Stream in GIP-based System", ICVCS 2008, The 9$^{th}$ International Conference for Young Computer Scientists, 2008, pp. 362-367.
Liao, X. et al., "Service Quality Assurance Mechanism for P2P SIP VoIP", 8$^{th}$ IFIP International Conference on Network and Parallel Computing, NPC 2011, ISBN: 978-3-642-24402-5, 2011, 15 pages.
Office Action dated Aug. 14, 2018 in Japanese Patent Application No. 2017-212074, 2 pages.
Office Action dated Feb. 12, 2019 in Japanese Patent Application No. 2017-212074.
Kurebayashi, Y. et al. "A proposal of TCP-splitting method based on minimization of bottleneck RTT and its evaluation using Planetlab environment" Internet Conference 2009, https://www.internetconference.org/ic2009/PDF/regular-paper/IC2009_Proceedings_02.pdf, 2009, pp. 25-31 (with English abstract).

* cited by examiner

TERMINAL, RELAY APPARATUS SELECTION APPARATUS, COMMUNICATION METHOD, RELAY APPARATUS SELECTION METHOD, AND PROGRAM

TECHNICAL FIELD

The present invention relates to communication between terminals via a relay apparatus.

BACKGROUND ART

In recent years, P2P communication that connects terminals with each other to perform communication has become widespread. There are various techniques as techniques for realizing P2P communication. For example, there is WebRTC which realizes P2P communication between browsers of terminals.

In order to perform P2P communication between terminals by WebRTC, both terminals need to know each other's address. Therefore, an address used for communication is determined using a technique called ICE (Interactive Connectivity Establishment).

In the ICE, each terminal collects usable addresses, exchanges the collected addresses between the terminals, selects an address with high priority among addresses that can be used for communication, and performs communication.

RELATED ART DOCUMENT

Patent Document (Patent Document 1) Jp2015-153076

SUMMARY OF THE INVENTION

Problem to be Solved by the Invention

For example, when direct communication between terminals cannot be performed according to the above-mentioned ICE procedure, communication between terminals is performed by way of a TURN (Traversal Using Relays around NAT) server which is a type of relay apparatuses.

However, for example, when a TURN server physically far away from a terminal or a TURN server with a large network distance in which physical distance is close is selected, the delay time between terminals via the TURN server increases. Thus, especially, in real-time communication such as voice and video, there is a possibility that communication quality may be degraded.

The above problem is not limited to communication by WebRTC but is a problem that can occur in the overall system in which communication between terminals via a relay apparatus is performed.

The present invention has been made in view of the above described point, and it is an object to provide a technique, in a system performing communication between terminals via a relay apparatus, that can properly select a relay apparatus for use by a terminal such that delay time between terminals becomes small.

Means for Solving the Problem

According to an embodiment of the present invention, there is provided a terminal used as a terminal in a plurality of terminals in a system including the plurality of terminals that communicate with each other and a plurality of relay apparatuses, including:

measurement means configured to measure a delay time between the terminal and each relay apparatus of the plurality of relay apparatuses;

selection means configured to select a relay apparatus from the plurality of relay apparatuses based on the delay time measured by the measurement means; and communication means configured to perform communication with another terminal via the relay apparatus.

According to an embodiment of the present invention, there is provided a communication method executed by a terminal used as a terminal in a plurality of terminals in a system including the plurality of terminals that communicate with each other and a plurality of relay apparatuses, including:

a measurement step of measuring a delay time between the terminal and each relay apparatus of the plurality of relay apparatuses;

a selection step of selecting a relay apparatus from the plurality of relay apparatuses based on the delay time measured by the measurement step; and a communication step of performing communication with another terminal via the relay apparatus.

According to an embodiment of the present invention, there is provided a relay apparatus selection apparatus that selects a relay apparatus used for communication between a first terminal and a second terminal in a plurality of terminals, in a system including a plurality of terminals that communicate with each other and a plurality of relay apparatuses, including:

acquisition means configured to acquire a delay time between the first terminal and each relay apparatus of the plurality of relay apparatuses, and a delay time between the second terminal and each relay apparatus of the plurality of relay apparatuses;

selection means configured to select a relay apparatus used for communication between the first terminal and the second terminal based on the delay time between the first terminal and each relay apparatus, the delay time between the second terminal and each relay apparatus, and delay times, being held beforehand, between relay apparatuses of each pair of relay apparatuses in the plurality of relay apparatuses; and notification means configured to notify the first terminal and the second terminal of a relay apparatus selected by the selection means.

According to an embodiment of the present invention, there is provided a relay apparatus selection method executed by a relay apparatus selection apparatus that selects a relay apparatus used for communication between a first terminal and a second terminal in a plurality of terminals, in a system including a plurality of terminals that communicate with each other and a plurality of relay apparatuses, including:

an acquisition step of acquiring a delay time between the first terminal and each relay apparatus of the plurality of relay apparatuses, and a delay time between the second terminal and each relay apparatus of the plurality of relay apparatuses;

a selection step of selecting a relay apparatus used for communication between the first terminal and the second terminal based on the delay time between the first terminal and each relay apparatus, the delay time between the second terminal and each relay apparatus, and delay times, being held beforehand, between relay apparatuses of each pair of relay apparatuses in the plurality of relay apparatuses; and a notification step of notifying the first terminal and the second terminal of a relay apparatus selected by the selection step.

Effect of the Present Invention

According to an embodiment of the present invention, there is provided a technique, in a system performing communication between terminals via a relay apparatus, that can properly select a relay apparatus for use by a terminal such that delay time between terminals becomes small.

EMBODIMENTS FOR CARRYING OUT THE INVENTION

Hereinafter, an embodiment (the present embodiment) of the present invention is described with reference to the drawings. Each embodiment described below is merely an example, and embodiments to which the present invention is applied are not limited to the following embodiments.

The relay apparatus in the present embodiment is, for example, the aforementioned TURN server, but it is not limited to a TURN server, and various servers can be used as the relay apparatus.

Further, in the present embodiment, for example, it is assumed that communication between terminals is performed using WebRTC, and as a result of the ICE procedure, communication is performed via a relay apparatus (TURN server) since direct communication cannot be performed. But this is only an example. For example, even if direct communication is possible, the relay apparatus may be used.

In addition, the technique for performing communication between terminals is not limited to WebRTC, and various communication schemes other than WebRTC can be used.

In the communication described in this embodiment, a pair of an IP address and a port number is used for specifying a destination of communication and the like. In the following, for convenience, a pair of an IP address and a port number is referred to as "address". Hereinafter, a first embodiment and a second embodiment are described.

First Embodiment

System Configuration Example

Figure 1:
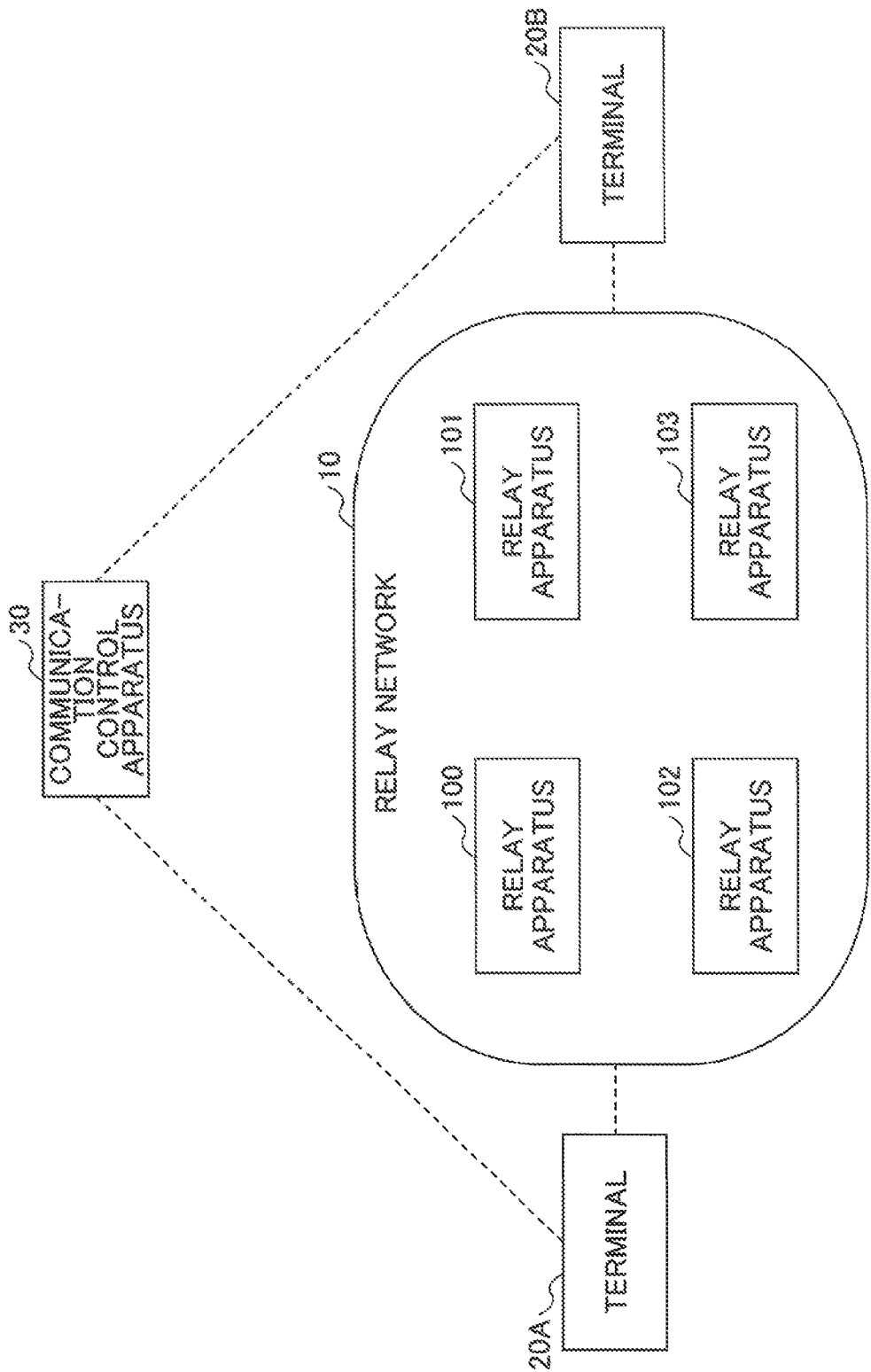
FIG. 1 is a diagram showing a whole configuration example of a system in a first embodiment of the present invention.

FIG. 1 shows an overall configuration example of a system according to the first embodiment. As shown in FIG. 1, the present system has a configuration in which a terminal 20A and a terminal 20B are connected to a relay network 10 that relays data communication. Further, as shown in FIG. 1, a communication control apparatus 30 is provided, and it is possible to perform control communication (signaling communication) between the terminal 20A and the terminal 20B via the communication control apparatus 30.

The above "data communication" includes communication such as voice and video, and may be referred to as "media communication". The control communication is performed using, for example, SIP, but control communication may be performed using protocols other than SIP.

The relay network 10 is provided with a plurality of relay apparatuses (100 to 103). Although four relay apparatuses are shown in FIG. 1 for convenience of illustration, actually more relay apparatuses are provided. However, fewer than four relay apparatuses may be provided. Hereinafter, when a specific relay apparatus of the relay apparatuses 100 to 103 is not specified, it is simply described as "relay apparatus" without any reference symbol.

The relay apparatus has a function of receiving a connection request from a terminal, issuing a relay address (address for relay) to the terminal, and relaying data communication using the relay address. When the relay apparatus is a TURN server, the connection request corresponds to an Allocation Request. In the present embodiment, communication between relay apparatuses is performed by UDP, but this is an example, and communication may be performed by TCP.

Each of the terminals 20A and 20B (which are described as "terminal 20" when they are not distinguished) is, for example, a PC, a smartphone, a tablet, or the like. An access apparatus such as a NAT apparatus and a firewall and the like is generally provided between the terminal 20 and the relay network 10.

As the access apparatus, there are an apparatus that transmits both UDP and TCP, an apparatus that intercepts UDP but that transmits TCP, an apparatus that intercepts TCP/UDP other than HTTP (including HTTPS), and the like. In the present embodiment, each terminal 20 can communicate (transmit and receive) with a relay apparatus traversing an access apparatus that accommodates the terminal 20 itself. As an example, in the case of an access apparatus that intercepts TCP/UDP other than HTTP (including HTTPS), it is assumed that the terminal 20 and the relay apparatus are connected via a HTTP tunnel.

System Operation

In the present embodiment, each terminal 20 measures an RTT (round trip time) between the terminal and each relay apparatus, selects a relay apparatus to be used by the terminal itself from a plurality of relay apparatuses based on the measurement result, and performs data communication between terminals via the relay apparatus.

Figure 2:
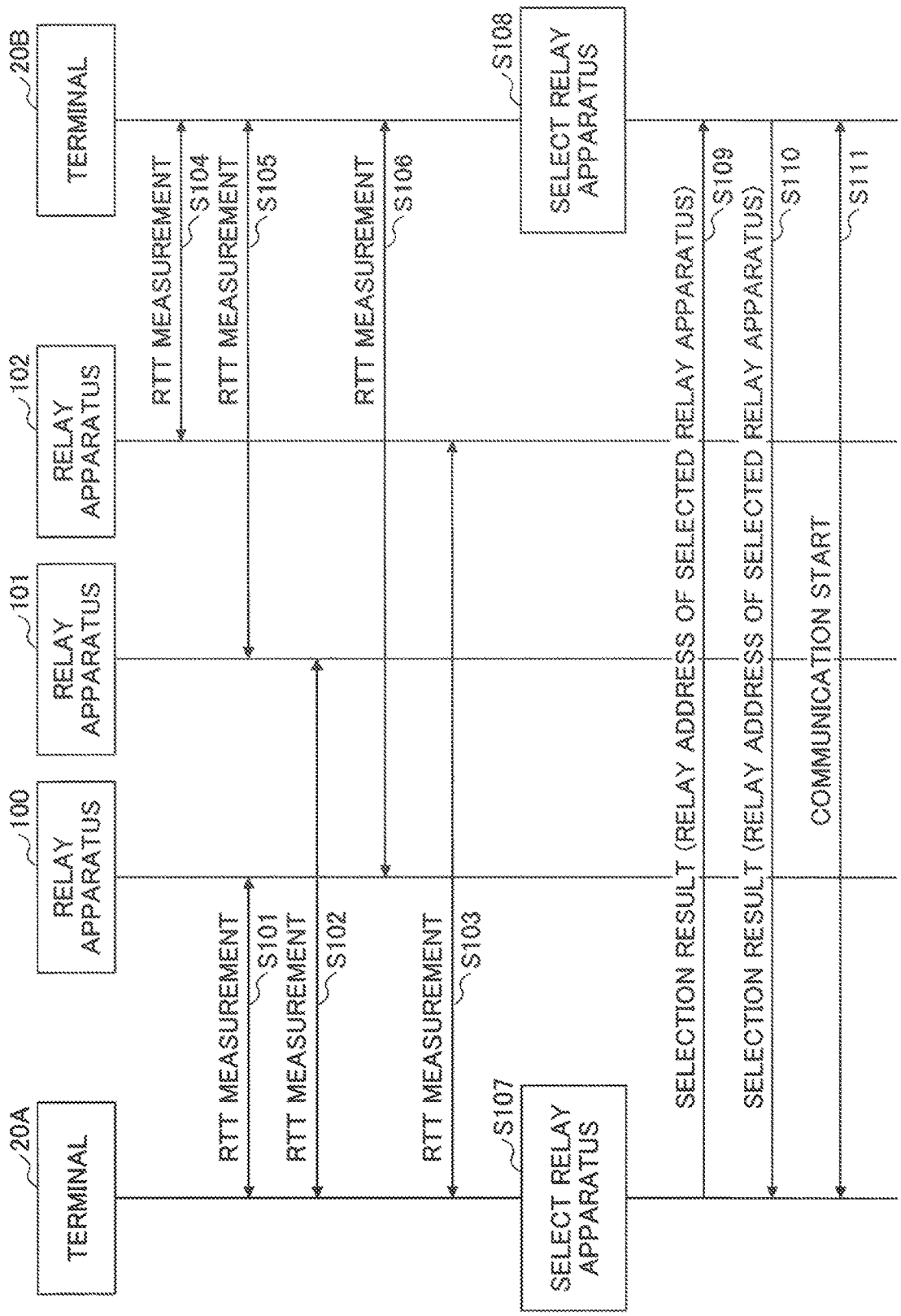
FIG. 2 is a sequence diagram for explaining an example of a process procedure in the first embodiment.

The process operation in the first embodiment is described with reference to a sequence diagram shown in FIG. 2 and the like. Here, a procedure up to starting of data communication between the terminal 20A and the terminal 20B is described. Control communication (exchange of addresses for relay and the like which is described later) between the terminal 20A and the terminal 20B is performed via the communication control apparatus 30, but in FIG. 2, the description of the communication control apparatus 30 is omitted. This also applies to other figures. In FIG. 2, three relay apparatuses of the relay apparatuses 100, 101, and 102 are shown in the relay network 10, and each terminal 20 selects one relay apparatus from these relay apparatuses.

As the premise of the procedure of FIG. 2, it is assumed that each terminal 20 acquires addresses of each relay apparatus and holds them in a storage means. Any method can be used for acquiring the addresses of each relay apparatus. For example, by providing a Web server storing addresses of each relay apparatus on a network, each terminals 20 obtains addresses of each relay apparatus from the Web server. The address is an address that is a destination for sending a packet for measuring on RTT or for sending a connection request.

In steps S101 to S103, the terminal 20A measures an RTT between the terminal 20A and each relay apparatus, and in steps S104 to S106, the terminal 20B measures an RTT between the terminal 20B and each relay apparatus.

More specifically, explaining with step S101 as an example, the terminal 20A transmits a packet to the relay apparatus 100, receives a response packet for the packet from the relay apparatus 100, and calculates an RTT by subtracting the time when transmitting the first packet from the time when receiving the response packet. The same applies to other relay apparatuses.

Any packet can be used as the packet used for RTT measurement as long as an RTT can be measured. For example, a STUN request/a STUN response, and an HTTP request/an HTTP response can be used.

For example, when using the STUN request/the STUN response, taking step S101 as an example, the terminal 20A transmits the STUN request to the relay apparatus 100, receives the STUN response for the STUN request from the relay apparatus 100, and calculates the RTT by subtracting the time when the STUN request is transmitted from the time when the STUN response is received.

A connection request/a connection response may be used as a packet used for RTT measurement. In the present embodiment, it is assumed to use the connection request/the connection response. At the stage of this RTT measurement, the terminal 20 and each relay apparatus are connected, and the terminal 20 acquires and holds a relay address of each relay apparatus.

In particular, when the relay apparatus is a TURN server, the STUN request/the STUN response can be used as a connection request/a connection response. That is, the terminal 20 transmits an Allocation Request as the STUN request and receives an Allocation Success Response as the STUN response. The STUN response includes a relay address issued by the relay apparatus, and the terminal 20 acquires the relay address from the STUN response.

On Relay Address

Figure 3:
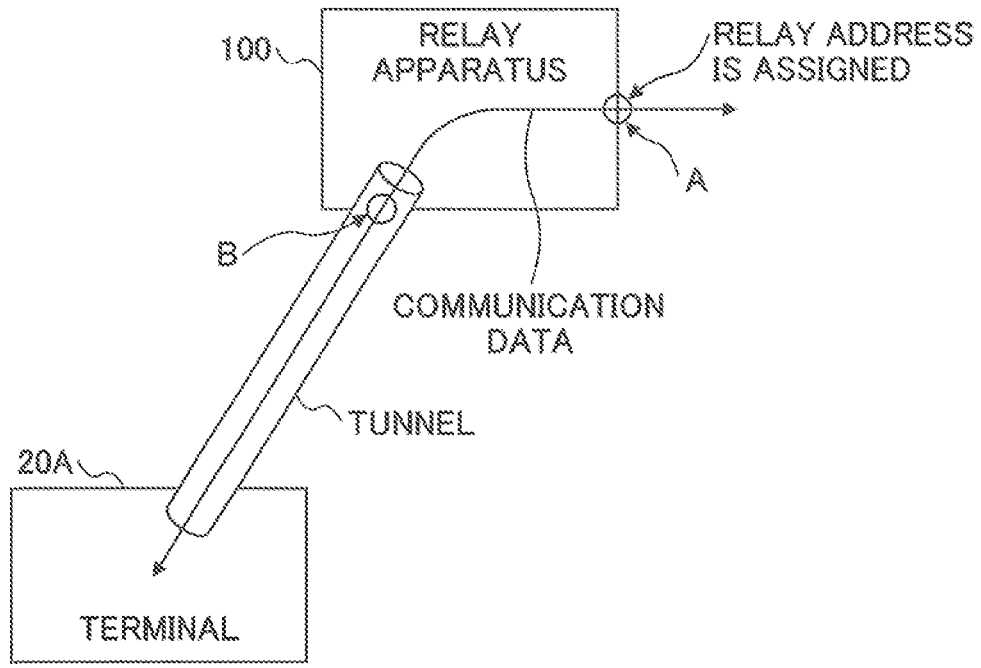
FIG. 3 is a diagram for explaining a relay address.

Hereinafter, the above-mentioned relay address is described with reference to FIG. 3. FIG. 3 shows an example of a case in which the terminal 20A connects to the relay apparatus 100 as an example. The terminal 20A transmits a connection request to an address of a port indicated by B of the relay apparatus 100. The relay apparatus 100 allocates a relay address which is an address of a port indicated by A, and includes the relay address in the connection response and returns it to the terminal 20A. At this time, a tunnel between the terminal 20A and the relay apparatus 100 is established.

By assigning the relay address in this manner, an address of the terminal 20A is seen from the outside as the relay address. That is, the relay address is used as a transmission source address of a packet transmitted by (an application of) the terminal 20A, and a terminal that performs communication to the terminal 20A uses the relay address as a destination address.

The explanation is continued returning to FIG. 2.

The terminal 20A that has measured the RTT between the terminal 20A and each relay apparatus in steps S101 to S103 selects one relay apparatus based on the RTT measurement result in step S107. Here, the terminal 20A selects a relay apparatus for which the smallest RTT has been obtained among a plurality of relay apparatuses for which RTT measurement has been performed. This makes it possible to select a relay apparatus with the smallest latency (may be referred to as delay time) between the terminal 20A and the relay apparatus. The terminal 20B also selects one relay apparatus in the same procedure. By connecting relay apparatuses with a circuit of low latency, communication with a short delay time can be realized by such a procedure.

As described above, in the present embodiment, each terminal 20 performs RTT measurement using a connection request/a connection response. Therefore, by performing RTT measurement, each terminal 20 acquires and holds a relay address of each relay apparatus. In step S109, the terminal 20A notifies the terminal 20B of the relay address of the relay apparatus selected in step S107. In step S110, the terminal 20B notifies the terminal 20A of the relay address of the relay apparatus selected in step S108.

As a result, the terminal 20A acquires the relay address of the terminal 20B, and the terminal 20B acquires the relay address of the terminal 20A. Therefore, it becomes possible to perform transmission and reception of data between the terminal 20A and the terminal 20B (step S111).

In the above example, connection with the relay apparatus is performed by packet transmission and reception for RTT measurement, but connection with the relay apparatus may be performed separately from packet transmission and reception for RTT measurement. In this case, for example, RTT measurement is performed by an HTTP request/an HTTP response. Then, after steps S107 and S108 shown in FIG. 2, connection request/connection response is performed for the selected relay apparatus, and after that, exchange of the relay addresses in steps S109 and S110 is performed.

Also, in the present embodiment, a relay apparatus for which the smallest RTT is obtained is selected, but there may be a case in which a relay apparatus for which the smallest RTT is not obtained is selected. For example, when the load is high or when some kind of trouble has occurred for the relay apparatus with the smallest RTT, it can be considered to select a relay apparatus with the second smallest RTT.

Example of Connection Configuration

Figure 4:
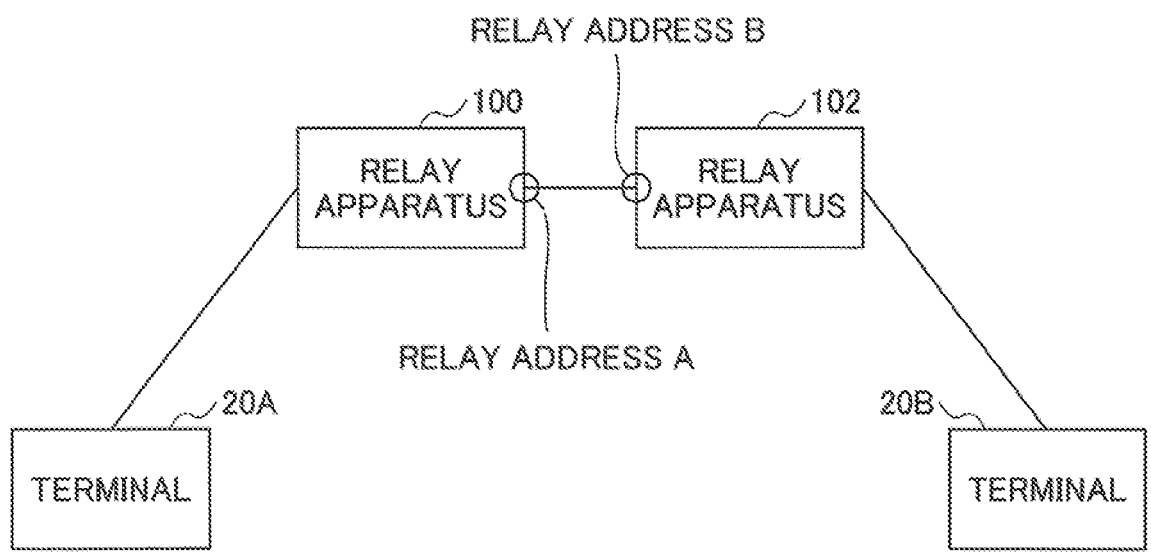
FIG. 4 is a diagram showing an example 1 of a communication route in step S111.
Figure 5:
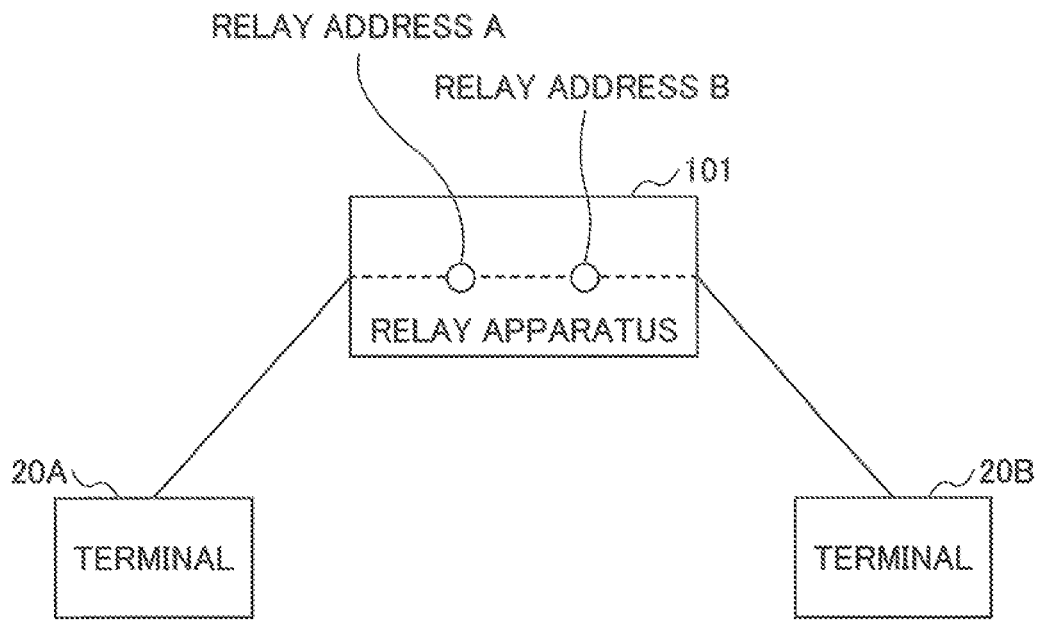
FIG. 5 is a diagram showing an example 2 of a communication route in step S111.

FIGS. 4 and 5 show examples of a connection configuration between terminals according to the selection result of the relay apparatus. Example 1 shown in FIG. 4 is a diagram showing an example in a case in which the terminal 20A selects the relay apparatus 100 and the terminal 20B selects the relay apparatus 102. In this case, as shown in FIG. 4, data communication is performed between the terminal 20A and the terminal 20B via the relay apparatus 100 and the relay apparatus 102.

Here, it is assumed that the relay address of the terminal 20A in the relay apparatus 100 is a relay address A, and the relay address of the terminal 20B in the relay apparatus 102 is a relay address B. In data communication, the terminal 20A transmits a packet having the relay address A as a transmission source address and having the relay address B as a destination address via a tunnel between the terminal 20A and the relay apparatus 100. The packet is transmitted, from the relay apparatus 100 to the relay address B, that is, to the relay apparatus 102, and is delivered to the terminal 20B via a tunnel between the relay apparatus 102 and the terminal 20B. The same applies to communication from the terminal 20B to the terminal 20A.

Example 2 shown in FIG. 5 is a diagram showing an example in a case in which the terminal 20A selects the relay apparatus 101 and the terminal 20B also selects the relay apparatus 101. In this case, as shown in FIG. 5, data communication between the terminal 20A and the terminal 20B is performed via the relay apparatus 101.

Here, it is assumed that the relay address of the terminal 20A in the relay apparatus 301 is a relay address A, and the relay address of the terminal 20B is a relay address B. In data communication, the terminal 20A transmits a packet having the relay address A as the transmission source address and having the relay address B as the destination address via a tunnel between the terminal 20A and the relay apparatus 101. The packet is logically transmitted to the relay address B inside the relay apparatus 101 and is delivered to the terminal 20B via a tunnel between the relay apparatus 101 and the terminal 20B. The same applies to communication from the terminal 20B to the terminal 20A.

Here, also in the conventional technique, there is a case in which two relay apparatuses are used as shown in FIG. 4 in order to distribute the load of the relay apparatuses. However, if load balancing is applied considering only load distribution, there is a possibility that a relay apparatus far from the terminal (that is, having a long delay time) is selected.

On the other hand, by applying the technique according to the present invention, it is possible to select a relay apparatus close to the terminal (that is, delay time is short).

Also, there is a case where it is desired not to form a communication path between two terminals by a single protocol but to use another protocol in a middle section. For example, there is a case in which the whole delay time can be shortened by providing two relay apparatuses as shown in FIG. 4 and using UDP between the relay apparatuses, rather than using TCP in the whole section between terminals for traversing access apparatuses such as a NAT apparatus or a firewall or the like.

Therefore, by applying the technique according to the present invention, TCP sections between the terminal and the relay apparatus can be minimized, and the delay time can be further shortened.

Apparatus Configuration Example

Figure 6:
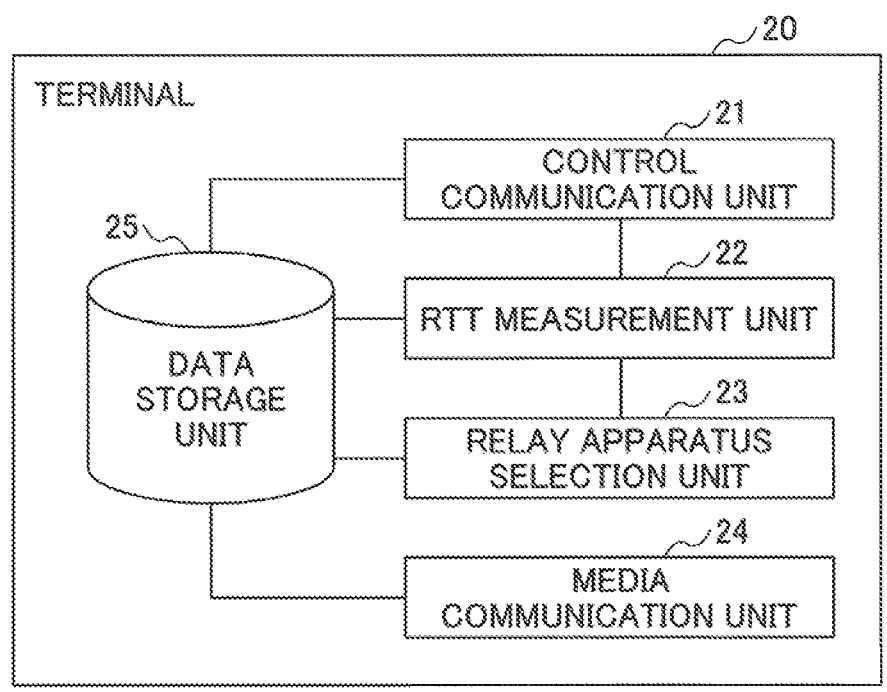
FIG. 6 is a block diagram of a terminal 20.

FIG. 6 shows a functional configuration example of the terminal 20 in the first embodiment. As shown in FIG. 6, the terminal 20 includes a control communication unit 21, an RTT measurement unit 22, a relay apparatus selection unit 23, a media communication unit 24, and a data storage unit 25.

The control communication unit 21 performs communication other than media communication. That is, the control communication unit 21 performs acquisition of addresses of relay apparatuses, packet transmission and reception for RTT measurement, transmission and reception of connection request/connection response, exchange of relay addresses, and the like. The RTT measurement unit 22 measures an RTT based on packet transmission and reception by the control communication unit 21.

The relay apparatus selection unit 23 selects a relay apparatus for which the smallest RTT is obtained from RTT measurement results for each relay apparatus. The media communication unit 24 transmits and receives audio, video, and the like to and from another terminal via the relay apparatus selected by the relay apparatus selection unit 23.

The data storage unit 25 stores data used in the terminal 20. For example, the data storage unit 25 stores addresses of each relay apparatus, RTT measurement results, information indicating a selected relay apparatus, relay addresses, data to be transmitted and received by the media communication unit 24, and the like.

The terminal 20 in the present embodiment can be realized, for example, by causing a computer to execute a program which describes the process content described in the present embodiment. More specifically, the functions of terminal 20 can be realized by executing a program corresponding to processes performed by the terminal 20 by using hardware resources such as a CPU, and a memory and the like in the computer. The program can be saved and distributed by recording the program in a computer readable recording medium (such as portable memory). Also, the program can be provided via a network such as the Internet, an electronic mail and the like.

When WebRTC is used as a P2P communication technique, for example, the terminal 20 can be realized by a terminal including a browser or software having a WebRTC communication function equivalent to a browser. When using WebRTC, the terminal 20 first acquires a program (Web application) from a server or the like provided in the network. By executing the program in the terminal 20, the functional configuration shown in FIG. 6, the processing operation described in FIG. 2, and the like are realized.

Figure 7:
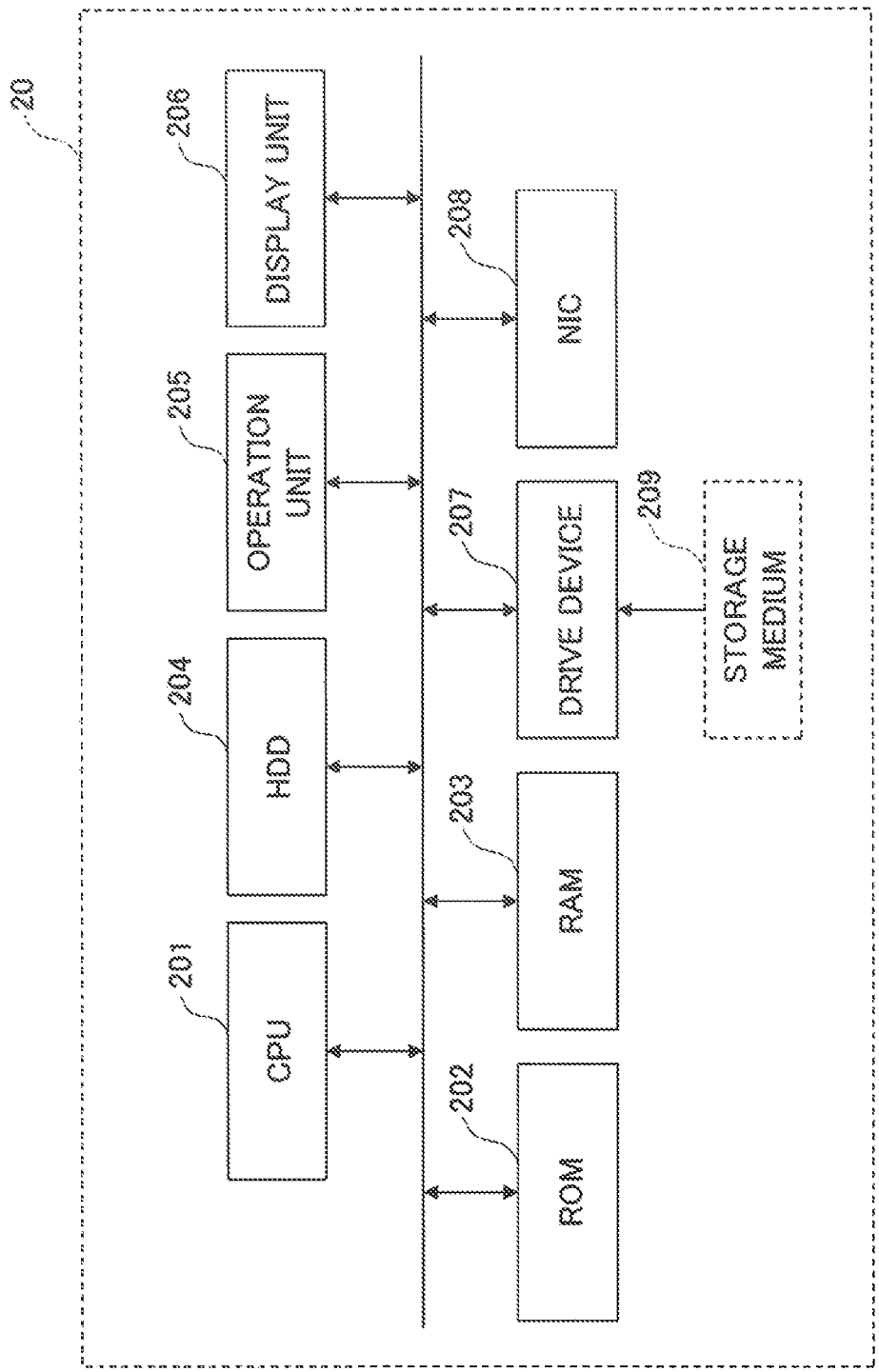
FIG. 7 is a diagram showing an example of a hardware configuration of the terminal 20.

FIG. 7 is a diagram illustrating an example of a hardware configuration of the terminal 20 realized by the computer. As shown in FIG. 7, the terminal 20 includes a CPU 201, a ROM 202, a RAM 203, an HDD 204, an operation unit 205, a display unit 206, a drive device 207, and a NIC (Network Interface card) 208.

The CPU 201 is a processor that performs overall control of the terminal 20. The CPU 201 executes programs such as an operating system, applications, various services, and the like stored in the HDD 204 or the like, and realizes various functions of the terminal 20. The ROM 202 stores various programs and data and the like used by the programs. The RAM 203 is used as a storage area for loading a program, a work area of a loaded program, and the like. Various information, programs, and the like are stored in the HDD 204.

The operation unit 205 is hardware for receiving an input operation from the user, and is, for example, a keyboard or a mouse. The display unit 206 is hardware for displaying to the user. The drive device 207 reads a program from the storage medium 209 in which the program is recorded. The program read by the drive device 207 is installed in, for example, the HDD 204. The NIC 208 is a communication interface for connecting the terminal 20 to the network and sending and receiving data.

Second Embodiment

Next, a second embodiment is described. Hereinafter, differences from the first embodiment are mainly described.

System Configuration, Operation Outline

Figure 8:
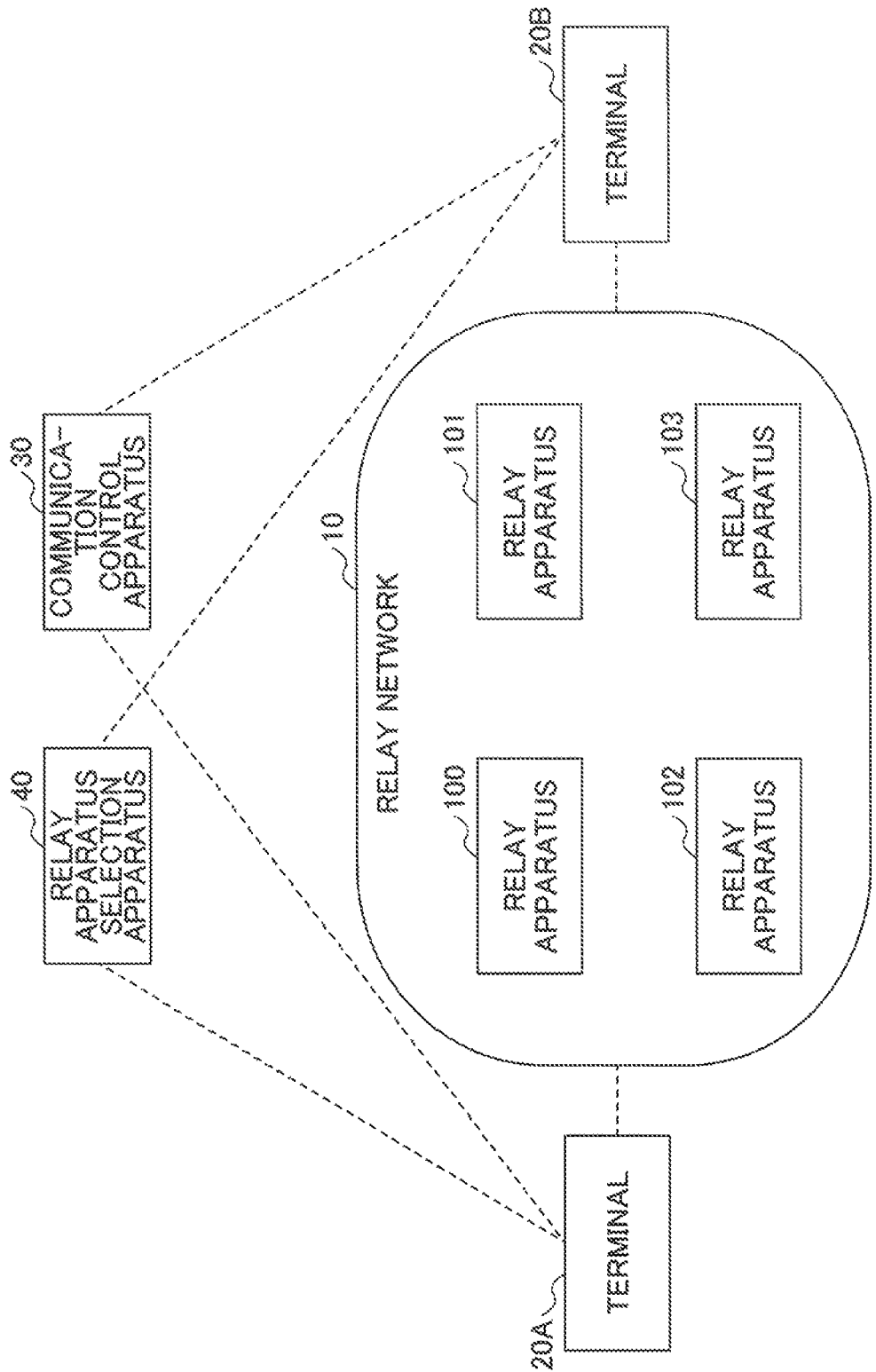
FIG. 8 is a diagram showing a whole configuration example of a system in a second embodiment of the present invention.

FIG. 8 is a diagram showing an example of the overall configuration of the system according to the second embodiment. As shown in FIG. 8, a relay apparatus selection apparatus 40 is provided. The configuration is the same as that of the first embodiment except that the relay apparatus selection apparatus 40 is provided.

The relay apparatus selection apparatus 40 can perform control communication with each terminal 20. The relay apparatus selection apparatus 40 receives an RTT measurement result from each terminal 20, and uses the RTT measurement results and RTTs, held beforehand, between relay apparatuses of arbitrary two points to determine a relay apparatus to be used for communication between terminals.

Note that the communication control apparatus 30 may include the function of the relay apparatus selection apparatus 40. In that case, the overall configuration is the same as that in the first embodiment. Also, in this case, the communication control apparatus may be referred to as a relay apparatus selection apparatus.

Figure 9:
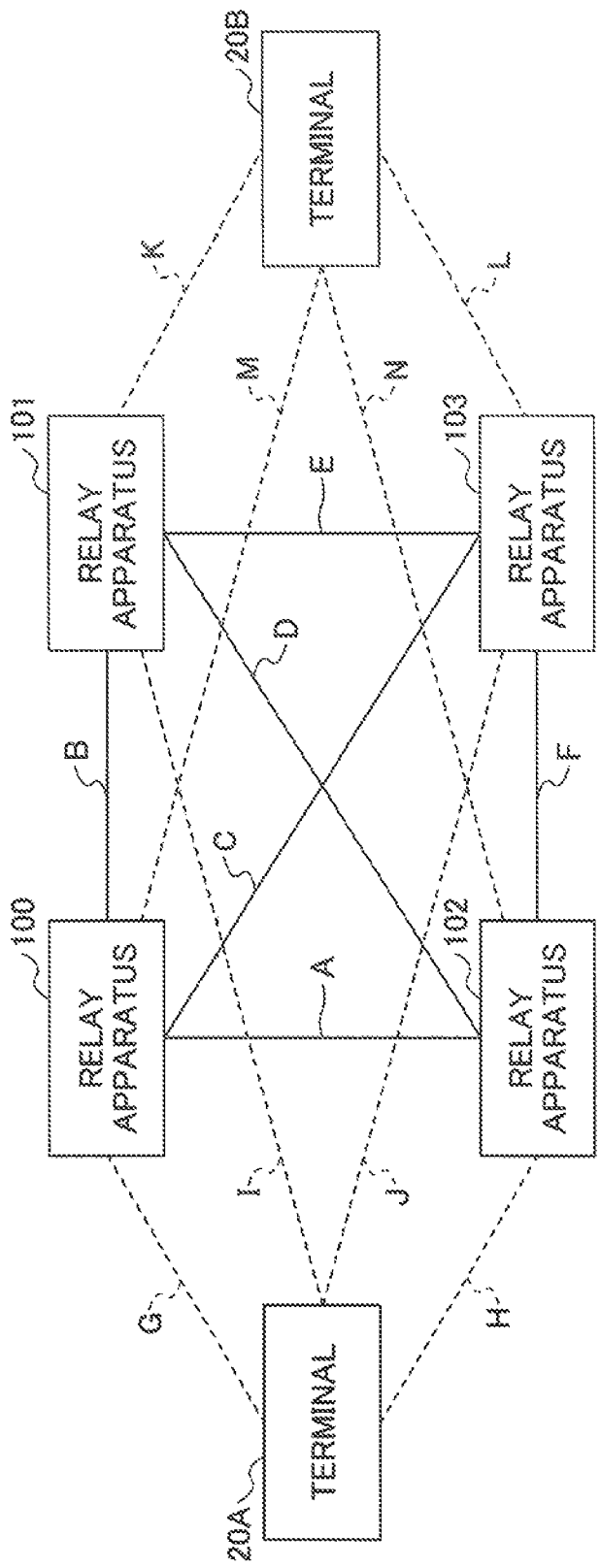
FIG. 9 is a diagram for explaining outline of the second embodiment.

FIG. 9 is a diagram for explaining the outline of relay apparatus selection processing in the second embodiment. In the present embodiment, RTTs between every two relay apparatuses are measured in advance, and the measurement results are held by the relay apparatus selection apparatus 40. As shown in FIG. 9, when four relay apparatuses are provided, as shown in the figure, RTTs in sections indicated by A to F (these characters indicate measurement results in the corresponding section) are measured. The measurement method is not limited to a specific method, and any method may be used for measurement.

Also, each terminal 20 measures an RTT between the terminal 20 and each relay apparatus and transmits the measurement result to the relay apparatus selection apparatus 40.

Then, the relay apparatus selection apparatus 40 selects, from all the routes between terminals, a route (relay apparatuses to be used) in which a sum of RTTs between the terminals is the smallest by using RTTs between relay apparatuses and RTTs between the terminal and relay apparatuses. Like the case of the first embodiment, when the load is high or some kind of trouble has occurred for the relay apparatus on the route, it can be considered to select a route with the second smallest RTT total instead of the route of the smallest.

Also, when determining the route, not only the case of two relay apparatuses (example: connection configuration of FIG. 4) but also the case of one relay apparatus (connection configuration of FIG. 5) are considered.

If G+B+K which is the total RTTs of a route of the terminal 20A–the relay apparatus 100–the relay apparatus 101–the terminal 20B shown in FIG. 9 is the smallest, as a relay apparatus to be used, the relay apparatus 100 is selected for the terminal 20A, and the relay apparatus 101 is selected for the terminal 20B. Also, if J+L which is the total RTTs of a route of the terminal 20A–the relay apparatus 103–the terminal 20B shown in FIG. 9 is the smallest, as a relay apparatus to be used, the relay apparatus 103 is selected for the terminal 20A, and the relay apparatus 103 is selected also for the terminal 20B.

Here, by considering that delay in UDP is smaller than that in TCP in the stage of data communication, for example, when performing communication using UDP between the terminal 20 and the relay apparatus, the calculation of the sum may be performed by estimating RTT between the terminal 20 and the relay apparatus to be small. Information indicating whether to perform communication by UDP between each terminal 20 and each relay apparatus is held by the relay apparatus selection apparatus 40 (the terminal 20A in the after mentioned another example) in advance, for example.

In this case, for example, in the calculation of an RTT total of a route of the terminal 20A–the relay apparatus 100–the relay apparatus 101–the terminal 20B shown in FIG. 9, if Z is a predetermined coefficient less than 1, the total of RTTs is calculated by Z×G+B+Z×K.

System Operation

The process operation in the second embodiment is described with reference to a sequence diagram shown in FIG. 10. Here, a procedure up to starting of data communication between the terminal 20A and the terminal 20B is described. Control communication (exchange of relay addresses and the like which is described later) between the terminal 20A and the terminal 20B is performed via the communication control apparatus 30, but in FIG. 10, the description of the communication control apparatus 30 is omitted. This also applies to FIG. 11. Also, in FIG. 10, a plurality of relay apparatuses provided in the relay network are described as "relay apparatus group".

Figure 10:
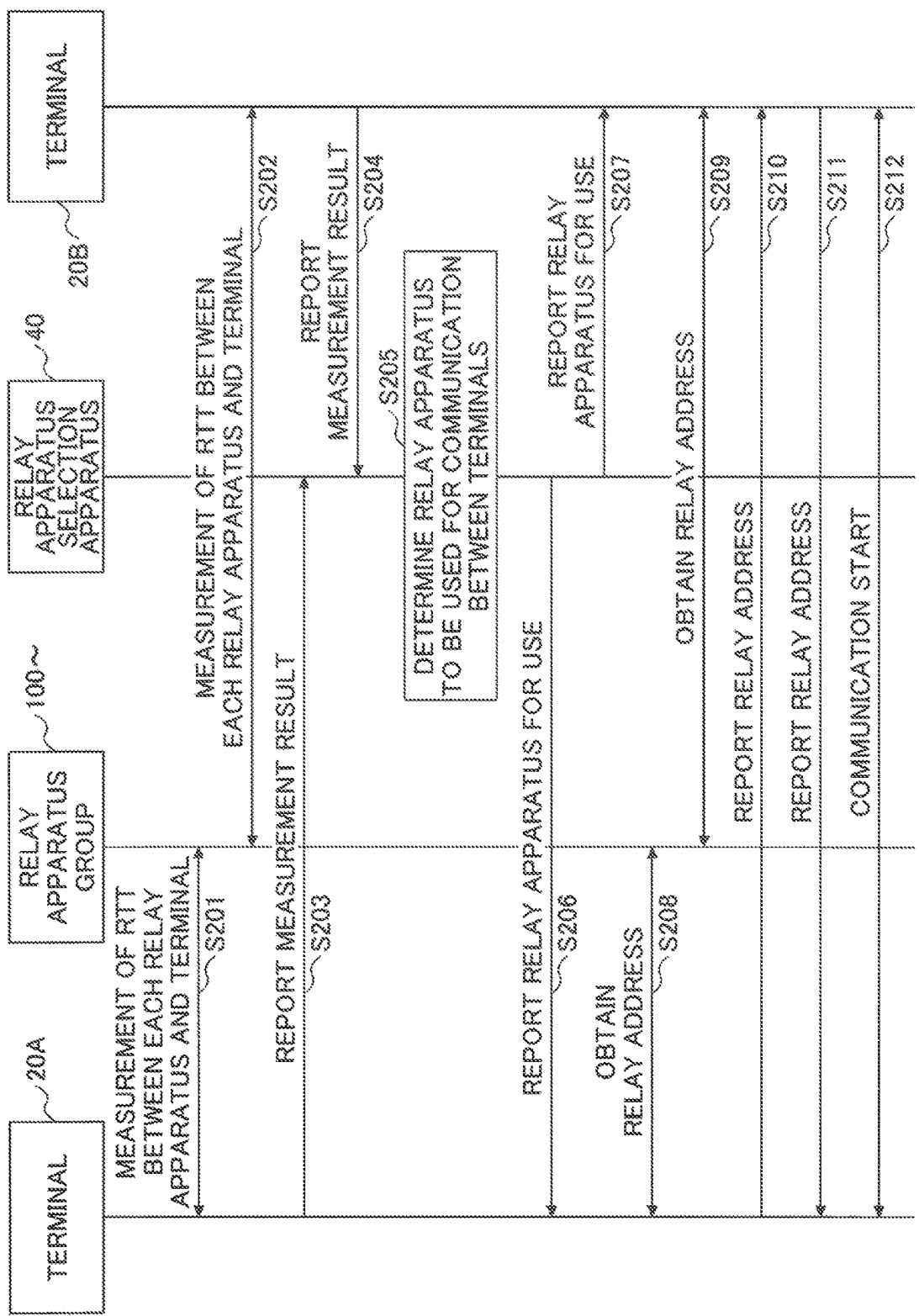
FIG. 10 is a sequence diagram for explaining an example of a process procedure in the second embodiment.

As the premise of the procedure of FIG. 10, the relay apparatus selection apparatus 40 holds RTTs between relay apparatuses of arbitrary two points. In addition, each terminal 20 holds addresses of each relay apparatus.

In step S201, the terminal 20A measures RTTs between the terminal 20A and each relay apparatus, and in step S202, the terminal 20B measures RTTs between the terminal 20B and each relay apparatus. As in the first embodiment, a connection request/a connection response may be used for RTT measurement, but in this case, a request/a response (example: HTTP request/HTTP response) is used.

In step S203, the terminal 20A transmits the RTTs between the terminal 20A and each relay apparatus to the relay apparatus selection apparatus 40. Also, in step S204, the terminal 20B transmits RTTs between the terminal 20B and each relay apparatus to the relay apparatus selection apparatus 40.

In step S205, the relay apparatus selection apparatus 40 determines a relay apparatus to be used for communication between the terminal 20A and the terminal 20B by using the measurement result of RTTs of each terminal 20 and RTTs between relay apparatuses held beforehand, in accordance with the method described with reference to FIG. 9.

In step S206, the relay apparatus selection apparatus 40 transmits identification information (may be an address) of the relay apparatus selected for the terminal 20A to the terminal 20A. In step S207, the relay apparatus selection apparatus 40 transmits the identification information (may be an address) of the relay apparatus selected for the terminal 20B to the terminal 20B.

In step S208, the terminal 20A transmits a connection request to the relay apparatus selected by the relay apparatus selection apparatus 40, and receives a connection response, so that the terminal 20A connects to the relay apparatus and obtains a relay address. Also, in step S209, the terminal 20B transmits a connection request to the relay apparatus selected by the relay apparatus selection apparatus 40, and receives a connection response, so that the terminal 20B connects to the relay apparatus and obtains a relay address.

In step S210, the terminal 20A notifies the terminal 20B of the relay address of the relay apparatus acquired in step S208. In step S211, the terminal 20B notifies the terminal 20A of the relay address of the relay apparatus acquired in step S209.

As a result, the terminal 20A acquires the relay address of the terminal 20B, and the terminal 20B acquires the relay address of the terminal 20A, so that it becomes possible to transmit and receive data between the terminal 20A and the terminal 20B (step S212).

Another Example of Operation

In the above example, the relay apparatus selection apparatus 40 selects the relay apparatus, but instead of that, the terminal 20 may select the relay apparatus.

The process operation of the system when the terminal 20 selects the relay apparatus is described with reference to a sequence diagram shown in FIG. 11. Here, a procedure up to starting data communication between the terminal 20A and the terminal 20B is described.

Figure 11:
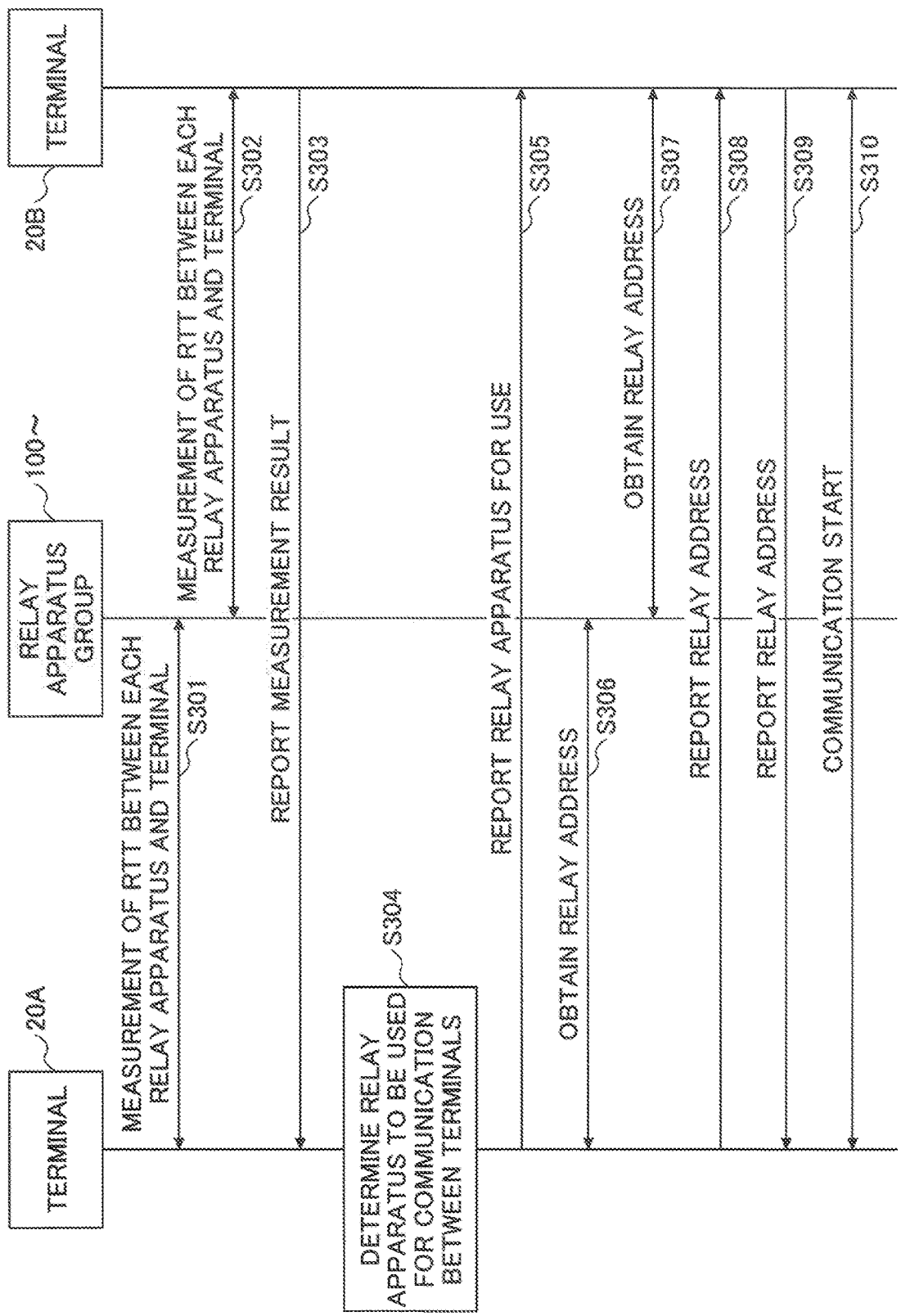
FIG. 11 is a sequence diagram for explaining another example of a process procedure in the second embodiment.

As the premise of the procedure of FIG. 11, each terminal 20 holds addresses of each relay apparatus. Also, the terminal 20A holds RTTs between relay apparatuses of arbitrary two points in advance. The RTTs between the relay apparatuses can be obtained from, for example, a Web server that holds the addressees of the relay apparatuses.

In the following processing, the terminal 20A among the two terminals communicating with each other performs processing for selecting a relay apparatus, but the terminal 20B may perform processing for selecting a relay apparatus. Further, the relay apparatus selection apparatus 40 or the communication control apparatus 30 may instruct which terminal to perform selection of the relay apparatus to the terminal.

In step S301, the terminal 20A measures RTTs between the terminal 20A and each relay apparatus, and in step S302, the terminal 20B measures RTTs between the terminal 20B and each relay apparatus.

In step S303, the terminal 20B transmits the RTTs between the terminal 20B and each relay apparatus to the terminal 20A.

In step S304, the terminal 20A determines a relay apparatus to be used for communication between the terminal 20A and the terminal 20B by the method described with reference to FIG. 9 by using RTT measurement results of each terminal 20 and RTTs between the relay apparatuses that are held beforehand.

In step S305, the terminal 20A transmits identification information (that may be an address) of the relay apparatus selected for the terminal 20B to the terminal 20B.

In step S306, the terminal 20A transmits a connection request to the relay apparatus selected for the terminal 20A, and receives a connection response, so that the terminal 20A connects to the relay apparatus and obtains a relay address. Also, in step S307, the terminal 20B transmits a connection request to the relay apparatus selected for the terminal 20B, and receives a connection response, so that the terminal 20B connects to the relay apparatus and obtains a relay address.

In step S308, the terminal 20A notifies the terminal 20B of the relay address of the relay apparatus acquired in step S306. Also, the terminal 20B notifies the terminal 20A of the relay address of the relay apparatus acquired in step S307.

Accordingly, the terminal 20A acquires the relay address of the terminal 20B and the terminal 20B acquires the relay address of the terminal 20A. Therefore, it becomes possible to perform transmission and reception of data between the terminal 20A and the terminal 20B (step S310).

Apparatus Configuration Example

Figure 12:
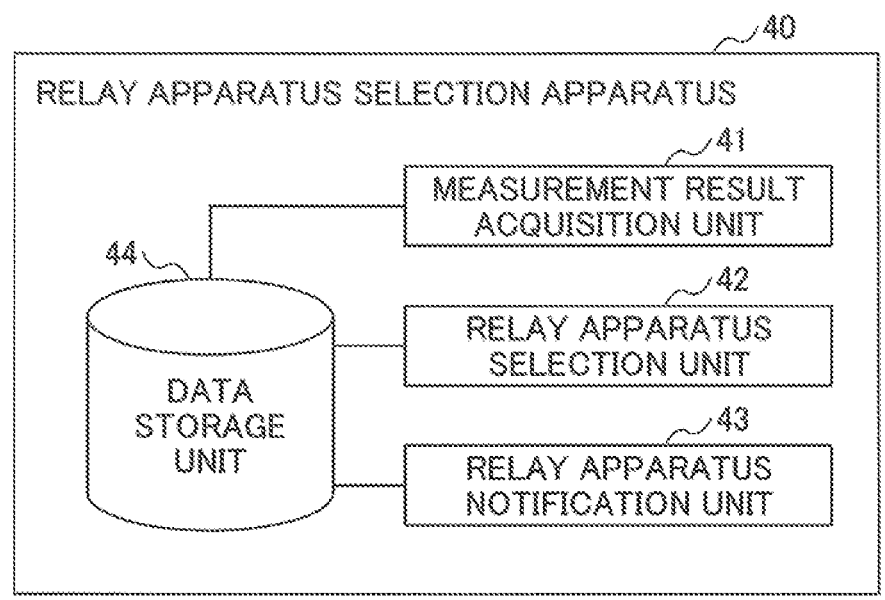
FIG. 12 is a block diagram of a relay apparatus selection apparatus 40.

FIG. 12 shows an example of a functional configuration of the relay apparatus selection apparatus 40 according to the second embodiment. As shown in FIG. 12, the relay apparatus selection apparatus 40 includes a measurement result acquisition unit 41, a relay apparatus selection unit 42, a relay apparatus notification unit 43, and a data storage unit 44.

The measurement result acquisition unit 41 receives, from each terminal, RTT measurement results between the terminal and each relay apparatus, and stores them in the data storage unit 44. By using the RTT measurement results between each terminal and each relay apparatus and RTTs between relay apparatuses stored in advance in the data storage unit 44, the relay apparatus selection unit 42 selects a relay apparatus to be used for communication between terminals by the method described with reference to FIG. 9.

The relay apparatus notification unit 43 notifies each terminal 20 of the relay apparatus selected by the relay apparatus selection unit 42. The data storage unit 44 stores RTTs between relay apparatus, the RTT measurement results between each terminal and each relay apparatus, and the like.

The relay apparatus selection apparatus 40 in the present embodiment can be realized, for example, by causing a computer to execute a program which describes the process content described in the present embodiment. More specifically, the functions of the relay apparatus selection apparatus 40 can be realized by executing a program corresponding to processes performed by the relay apparatus selection apparatus 40 by using hardware resources such as a CPU, and a memory and the like in the computer. The program can be saved and distributed by recording the program in a computer readable recording medium (such as portable memory). Also, the program can be provided via a network such as the Internet, an electronic mail and the like.

The hardware configuration of the relay apparatus selection apparatus 40 realized by a computer is the same as the configuration shown in FIG. 7.

As shown in FIG. 11, even when the terminal 20 performs selection process of a relay apparatus, the overall configuration of the terminal 20 is the same as the configuration shown in FIG. 6 and FIG. 7. However, in the configuration shown in FIG. 6, when the terminal 20 performs selection process of a relay apparatus, the control communication unit 21 performs acquisition of RTTs between relay apparatuses, acquisition of addresses of relay apparatuses, packet transmission and reception for RTT measurement, transmission and reception of a connection request/a connection response, RTT reception from a partner terminal, RTT transmission to a partner terminal, reception of a relay apparatus selection result from a partner terminal, transmission of a relay apparatus selection result to a partner terminal, exchange of relay addresses, and the like.

The relay apparatus selection unit 23 selects a relay apparatus by the method described with reference to FIG. 9 using RTTs between each terminal and each relay apparatus and RTTs between relay apparatuses. The media communication unit 24 connects to the selected relay apparatus, and transmits and receives, for example, voice, video, and the like to and from a partner terminal via the relay apparatus.

The data storage unit 25 stores data used in the terminal 20. For example, the data storage unit 25 stores RTTs between the relay apparatuses, addresses of each relay apparatus, RTT measurement results, information indicating selected relay apparatuses, relay addresses, data transmitted and received by the media communication unit 24, and the like.

As described above, according to the second embodiment, communication with low latency between terminals can be realized with high accuracy.

Summary of Embodiments

As described above, according to an embodiment, there is provided a terminal used as a terminal in a plurality of terminals in a system including the plurality of terminals that communicate with each other and a plurality of relay apparatuses, including:

measurement means configured to measure a delay time between the terminal and each relay apparatus of the plurality of relay apparatuses;

selection means configured to select a relay apparatus from the plurality of relay apparatuses based on the delay time measured by the measurement means; and communication means configured to perform communication with another terminal via the relay apparatus.

According to an embodiment, there is provided a terminal used as a terminal in a plurality of terminals in a system including the plurality of terminals that communicate with each other and a plurality of relay apparatuses, including:

acquisition means configured to acquire addresses of the plurality of relay apparatuses;

measurement means configured to measure a delay time between the terminal and each relay apparatus of the plurality of relay apparatuses using the addresses acquired by the acquisition means;

selection means configured to select a relay apparatus for which the delay time is the smallest from the plurality of relay apparatuses based on the delay time measured by the measurement means;

notification means configured to notify another terminal of a relay address of the terminal in the relay apparatus; and communication means configured to perform communication with another apparatus via the relay apparatus using the relay address as a transmission source address.

For example, the measurement means transmits a connection request to each relay apparatus, measures the delay time by receiving a connection response from the relay apparatus, and obtains the relay address from the connection response.

According to an embodiment, there is provided a terminal used as a first terminal that selects a relay apparatus used for communication between the first terminal and a second terminal in a plurality of terminals, in a system including a plurality of terminals that communicate with each other and a plurality of relay apparatuses, including:

acquisition means configured to acquire a delay time between the first terminal and each relay apparatus of the plurality of relay apparatuses, and a delay time between the second terminal and each relay apparatus of the plurality of relay apparatuses;

selection means configured to select a relay apparatus used for communication between the first terminal and the second terminal based on the delay time between the first terminal and each relay apparatus, the delay time between the second terminal and each relay apparatus, and delay times, being held beforehand, between relay apparatuses of each pair of relay apparatuses in the plurality of relay apparatuses; and notification means configured to notify the second terminal of a relay apparatus selected for the second terminal.

According to an embodiment, there is provided a relay apparatus selection apparatus that selects a relay apparatus used for communication between a first terminal and a second terminal in a plurality of terminals, in a system including a plurality of terminals that communicate with each other and a plurality of relay apparatuses, including:

acquisition means configured to acquire a delay time between the first terminal and each relay apparatus of the plurality of relay apparatuses, and a delay time between the second terminal and each relay apparatus of the plurality of relay apparatuses;

selection means configured to select a relay apparatus used for communication between the first terminal and the second terminal based on the delay time between the first terminal and each relay apparatus, the delay time between the second terminal and each relay apparatus, and delay times, being held beforehand, between relay apparatuses of each pair of relay apparatuses in the plurality of relay apparatuses; and notification means configured to notify the first terminal and the second terminal of a relay apparatus selected by the selection means.

For example, the selection means selects a relay apparatus for which a sum of delay times between the first terminal and the second terminal is the smallest based on the delay time between the first terminal and each relay apparatus, the delay time between the second terminal and each relay apparatus, and the delay times between relay apparatuses of each pair.

The present invention is not limited to the above-mentioned specific embodiments, and can be variously modified and applied within the scope of the present invention described in the claims.

The present patent application claims priority based on Japanese patent application No. 2016-018145, filed in the JPO on Feb. 2, 2016, and the entire contents of the Japanese patent application No. 2016-018145 are incorporated herein by reference.

DESCRIPTION OF REFERENCE SIGNS 10 relay network
20A, 20B terminal
100-103 relay apparatus
30 communication, control apparatus
40 relay apparatus selection apparatus
21 control communication unit
22 RRT measurement unit
23 relay apparatus selection unit
24 media communication unit
25 data storage unit
41 measurement result acquisition unit
42 relay apparatus selection unit
43 relay apparatus notification unit
44 data storage unit

The invention claimed is:

1. A terminal used as a first terminal that selects a relay apparatus used for communication between the first terminal and a second terminal in a plurality of terminals in a system including the plurality of terminals that communicate with each other and a plurality of relay apparatuses, comprising:

processing circuitry configured to acquire addresses of the plurality of relay apparatuses;

measure a delay time between the first terminal and each relay apparatus of the plurality of relay apparatuses using the addresses acquired by the processing circuitry;

select a first relay apparatus for which the delay time is the smallest from the plurality of relay apparatuses based on the delay time measured by the processing circuitry;

notify the second terminal of a relay address of the first terminal in the first relay apparatus;

receive, from the second terminal, a relay address of the second terminal in a second relay apparatus that is selected in the second terminal by measuring a delay time between the second terminal and each relay apparatus of the plurality of relay apparatuses; and perform communication with the second terminal via the first relay apparatus and the second relay apparatus using the relay address of the first terminal as a transmission source address and using the relay address of the second terminal as a transmission destination address.

2. A non-transitory computer-readable recording medium storing a program that causes a computer to function as the terminal as claimed in claim 1.

3. The terminal as claimed in claim 1, wherein the processing circuitry transmits a connection request to each relay apparatus, measures the delay time by receiving a connection response from the relay apparatus, and obtains the relay address of the first terminal from the connection response.

4. A communication method executed by a terminal used as a first terminal that selects a relay apparatus used for communication between the first terminal and the second terminal in a plurality of terminals in a system including the plurality of terminals that communicate with each other and a plurality of relay apparatuses, comprising:

acquiring addresses of the plurality of relay apparatuses;

measuring a delay time between the first terminal and each relay apparatus of the plurality of relay apparatuses using the acquired addresses;

selecting a first relay apparatus for which the delay time is the smallest from the plurality of relay apparatuses based on the measured delay time;

notifying the second terminal of a relay address of the first terminal in the first relay apparatus;

receiving, from the second terminal, a relay address of the second terminal in a second relay apparatus that is selected in the second terminal by measuring a delay time between the second terminal and each relay apparatus of the plurality of relay apparatuses; and performing communication with the second terminal via the first relay apparatus and the second relay apparatus using the relay address of the first terminal as a transmission source address and using the relay address of the second terminal as a transmission destination address.

* * * * *